United States Patent
Plüss et al.

(10) Patent No.: US 12,074,950 B2
(45) Date of Patent: Aug. 27, 2024

(54) SYSTEM AND METHOD OF FACILITATING DATA COMMUNICATION BETWEEN AN INTERNET OF THINGS DEVICE AND A CLOUD-BASED COMPUTER SYSTEM

(71) Applicant: LEGIC Identsystems AG, Wetzikon (CH)

(72) Inventors: Marcel Plüss, Tann (CH); Michael Würth, Winterthur (CH)

(73) Assignee: LEGIC Identsystems AG, Wetzikon (CH)

( * ) Notice: Subject to any disclaimer, the term of this patent is extended or adjusted under 35 U.S.C. 154(b) by 15 days.

(21) Appl. No.: 17/612,032

(22) PCT Filed: May 25, 2020

(86) PCT No.: PCT/EP2020/064455
§ 371 (c)(1),
(2) Date: Nov. 17, 2021

(87) PCT Pub. No.: WO2020/239701
PCT Pub. Date: Dec. 3, 2020

(65) Prior Publication Data
US 2022/0232092 A1 Jul. 21, 2022

(30) Foreign Application Priority Data

May 29, 2019 (CH) ..................................... 00699/19

(51) Int. Cl.
*H04L 67/2869* (2022.01)
*H04L 69/18* (2022.01)
*G16Y 30/00* (2020.01)

(52) U.S. Cl.
CPC .......... *H04L 67/2869* (2022.05); *H04L 69/18* (2013.01); *G16Y 30/00* (2020.01)

(58) Field of Classification Search
CPC ........... H04L 2012/285; H04L 12/2854; H04L 41/0803; H04L 67/12; H04L 67/10; H04L 67/34
See application file for complete search history.

(56) References Cited

U.S. PATENT DOCUMENTS 11,134,135 B1 * 9/2021 Chang ................. H04L 67/5682
2013/0066940 A1 3/2013 Shao
(Continued)

OTHER PUBLICATIONS

Jun. 17, 2020—(PCT/EP) International Search Report and Written Opinion—App 2020/064455.
(Continued)

*Primary Examiner* — Chirag R Patel
(74) *Attorney, Agent, or Firm* — Banner & Witcoff, Ltd.

(57) ABSTRACT

An intermediary computer system is provided for facilitating data communication between an Internet of Things device and a cloud-based computer system, the intermediary computer system configured to exchange data packages with the Internet of Things device, to exchange data packages with a plurality of cloud-based computer systems, to store a variable mapping of the Internet of Things device to a selected one of the plurality of cloud-based computer systems, and to receive a data package from the Internet of Things device and to forward the data package to the selected one of the plurality of cloud-based computer systems mapped to the Internet of Things device.

20 Claims, 3 Drawing Sheets

(56) References Cited

U.S. PATENT DOCUMENTS

| | | |
|---|---|---|
| 2015/0052247 A1 | 2/2015 | Threefoot et al. |
| 2017/0093915 A1 | 3/2017 | Ellis et al. |
| 2018/0227199 A1* | 8/2018 | Liu ........................ H04L 69/18 |
| 2019/0123978 A1 | 4/2019 | Shaw et al. |
| 2020/0053190 A1* | 2/2020 | Uddin ..................... H04L 45/64 |
| 2020/0280480 A1* | 9/2020 | Creasey ................. H04L 65/80 |

OTHER PUBLICATIONS

Mar. 17, 2023—(EP) Communication pursuant to article 94(3) EPC—App 20 278 033.0.

* cited by examiner

SYSTEM AND METHOD OF FACILITATING DATA COMMUNICATION BETWEEN AN INTERNET OF THINGS DEVICE AND A CLOUD-BASED COMPUTER SYSTEM

CROSS-REFERENCE TO RELATED APPLICATIONS

The present application is a U.S. National Phase filing of International Application No. PCT/EP2020/064455, filed on May 25, 2020, and claiming priority to Switzerland Patent Application No. 0069919 filed May 29, 2019. The present application claims priority to and the benefit of all the above-identified applications, which are all incorporated by reference herein in their entireties.

FIELD OF THE DISCLOSURE

The present disclosure relates to a method and system for facilitating data communication between an Internet of Things device and a cloud-based computer system. Specifically, the present disclosure relates to an intermediary computer system, a computer-implemented method, and a computer program product for facilitating data communication between an Internet of Things device and a cloud-based computer system.

BACKGROUND OF THE DISCLOSURE

The Internet of Things (IoT) involves enabling hardware which traditionally does not have, or has only very specific, network connectivity, to connect to the Internet, either wired or wirelessly, to transmit and receive data over the Internet such that it can be remotely monitored and controlled. Internet of Things devices span all areas of private, industrial, and commercial spheres. Consumer devices, such as smart TVs and appliances can communicate over the Internet with back-end systems which, for example, enable businesses to deliver new kinds of services. Industrial IoT devices can monitor the hardware of machinery and send diagnostic information such as maintenance alerts over the Internet to a central (or distributed) systems.

Server virtualization capabilities have advanced to the point where many companies and enterprises no longer have their own servers on site, but rent servers located in large server farms from service providers. These cloud-based computer systems, comprising storage systems, processing systems, etc. often do not assign a server to a particular customer on a fixed basis, but assign servers dynamically based on customer demand. This increases the flexibility with which customers can scale their systems and services, and also allows the hosting services to be flexible in assigning capacity of their servers to their customers.

As these server virtualization capabilities have progressed, it has become possible to change service providers. Despite the use of technologies such as virtual machines and containers, this migration remains cumbersome, as virtual machine (VM) instances must be stopped, new identity, access management permissions, and credentials must be created, new VM instances created and configured, data transferred, discs reattached, clients reconfigured, and so on and so forth. Planning and executing a migration remains therefore a major task and can cause interruptions in service availability and uptime.

SUMMARY OF THE DISCLOSURE

It is an embodiment of this disclosure to provide a method and system for facilitating data communication between an Internet of Things device and a cloud-based computer system. In particular, it is an embodiment of the present disclosure to provide an intermediary computer system, a computer-implemented method, and a computer program product for facilitating data communication between an Internet of Things device and a cloud-based computer system.

According to the present disclosure, these are achieved through the features of the independent claims. In addition, further advantageous embodiments follow from the dependent claims and the description.

According to the present disclosure, the above-mentioned embodiments are particularly achieved by an intermediary computer system for facilitating data communication between an Internet of Things device and a cloud-based computer system, the intermediary computer system comprising one or more processors. The one or more processors are configured to exchange data packages with the Internet of Things device via one or more communication channels and to exchange data packages with a plurality of cloud-based computer systems via communication network. The one or more processors are configured to store a variable mapping of the Internet of Things device to a selected one of the plurality of cloud-based computer systems, and to receive a data package from the Internet of Things device via the one or more communication channels and to forward the data package via the communication network to the selected one of the plurality of cloud-based computer systems mapped to the Internet of Things device.

In an embodiment, the one or more processors are configured to implement a plurality of different communication protocol stacks, and to exchange the data packages with a particular one of the cloud-based computer systems, using the protocol communication stack associated with the particular one of the cloud-based computer systems.

In an embodiment, the one or more processors are further configured to receive from an authorized user system configuration commands for mapping the Internet of Things device to one or more selected cloud-based computer systems and to store the mapping of the Internet of Things device to the selected one or more cloud-based computer systems, in response to the configuration commands. The one or more processors are further configured to forward the data package received from the Internet of Things device to the selected one or more cloud-based computer systems mapped to the Internet of Things device.

In a variation, the one or more processors are further configured to receive from an authorized user system group configuration commands for mapping a defined group of a plurality of Internet of Things devices to one or more selected cloud-based computer systems. The one or more processors are further configured to store the mapping of the defined group of Internet of Things devices to the selected one or more cloud-based computer systems, in response to the group configuration commands, and to forward data packages received from one of the defined group of Internet of Things devices to the selected one or more cloud-based computer systems mapped to the defined group of Internet of Things devices.

In an embodiment, the one or more processors are further configured to receive from an authorized user system time configuration commands for a time-based mapping of one or more Internet of Things devices to different cloud-based computer systems for different time periods; to store the time-based mapping, in response to the time configuration commands; and to forward data packages received from a particular Internet of Things device to one or more cloud-based computer systems, depending on a current time and the time-based mapping of the particular Internet of Things device.

In an embodiment, the one or more processors are further configured to store a load-dependent mapping of the Internet of Things device to different cloud-based computer systems for different load conditions associated with the different cloud-based computer systems. The one or more processors then forward data packages received from the Internet of Things device to one or more cloud-based computer systems, depending on current load conditions of the cloud-based computer systems and the load-dependent mapping.

In an embodiment, the one or more processors are further configured to store a content-dependent mapping of the Internet of Things device to different cloud-based computer systems for different content types associated with the data package from the Internet of Things device. The one or more processors then receive from the Internet of Things device a content type indicator with the data package and forward the data package received from the Internet of Things device to one or more cloud-based computer systems, depending on the content type indicator received from the Internet of Things device and the content-dependent mapping.

In an embodiment, the one or more processors are configured to exchange the data packages with the Internet of Things device via communication channels comprising one or more of: Radio Frequency IDentifier (RFID), Bluetooth, Bluetooth Low Energy, a Wireless Local Area Network, a cellular mobile radio network, a Local Area Network, and the Internet.

In addition to an intermediary computer system, the present disclosure also relates to a computer-implemented method of facilitating data communication between an Internet of Things device and a cloud-based computer system. The computer-implemented method comprises providing an intermediary computer system configured to exchange data packages with the Internet of Things device via one or more communication channels, and exchanging data packages with a plurality of cloud-based computer systems via a communication network. The method further comprises storing in the intermediary computer system a variable mapping of the Internet of Things device to a selected one of the plurality the cloud-based computer systems; receiving in the intermediary computer system a data package from the Internet of Things device via the one or more communication channels, and forwarding by the intermediary computer system the data package via the communication network to the selected one of the plurality of cloud-based computer systems mapped to the Internet of Things device.

In an embodiment, the method further comprises the intermediary computer system receiving from an authorized user system configuration commands for mapping the Internet of Things device to one or more selected cloud-based computer systems, storing the mapping of the Internet of Things device to the selected one or more cloud-based computer systems, in response to the configuration commands, and forwarding the data package received from the Internet of Things device to the selected one or more cloud-based computer systems mapped to the Internet of Things device.

In an embodiment, the method further comprises the intermediary computer system receiving from an authorized user system group configuration commands for mapping a defined group of a plurality of Internet of Things devices to one or more selected cloud-based computer systems. The intermediary computer system then stores the mapping of the defined group of Internet of Things devices to the selected one or more cloud-based computer systems, in response to the group configuration commands, and forwards data packages received from one of the defined group of Internet of Things devices to the selected one or more cloud-based computer systems mapped to the defined group of Internet of Things devices.

In an embodiment, the method further comprises the intermediary computer system receiving from an authorized user system time configuration commands for a time-based mapping of one or more Internet of Things devices to different cloud-based computer systems for different time periods. The intermediary computer system stores the time-based mapping, in response to the time configuration commands, and forwards data packages received from a particular Internet of Things device to one or more cloud-based computer systems, depending on a current time and the time-based mapping of the particular Internet of Things device.

In an embodiment, the method further comprises the intermediary computer system storing a load-dependent mapping of the Internet of Things device to different cloud-based computer systems for different load conditions associated with the different cloud-based computer systems. The intermediary computer system then forwards data packages received from the Internet of Things device to one or more cloud-based computer systems, depending on current load conditions of the cloud-based computer systems and the load-dependent mapping.

In an embodiment, the method further comprises the intermediary computer system storing a content-dependent mapping of the Internet of Things device to different cloud-based computer systems for different content types associated with the data package from the Internet of Things device. The intermediary computer system then receives from the Internet of Things device a content type indicator with the data package, and forwards the data package received from the Internet of Things device to one or more cloud-based computer systems, depending on the content type indicator received from the Internet of Things device and the content-dependent mapping.

In addition to an intermediary computer system and a computer-implemented method, the present disclosure also relates to a computer program product comprising a non-transitory computer-readable medium having stored thereon computer program code configured to control one or more processors of an intermediary computer system. The intermediary computer system is configured to exchange data packages with an Internet of Things device via one or more communication channels and to exchange data packages with a plurality of cloud-based computer systems via a communication network. The computer program code is configured to control the one or more processors of the intermediary computer system, such that the intermediary computer system performs the following steps: storing a variable mapping of the Internet of Things device to a selected one of the plurality of cloud-based computer systems; receiving a data package from the Internet of Things device via the one or more communication channels; and forwarding the data package via the communication network to the selected one of the plurality of cloud-based computer systems mapped to the Internet of Things device.

BRIEF DESCRIPTION OF THE DRAWINGS

The present disclosure will be explained in more detail, by way of example, with reference to the drawings in which.

DETAILED DESCRIPTION OF THE PREFERRED EMBODIMENTS

Figure 1:
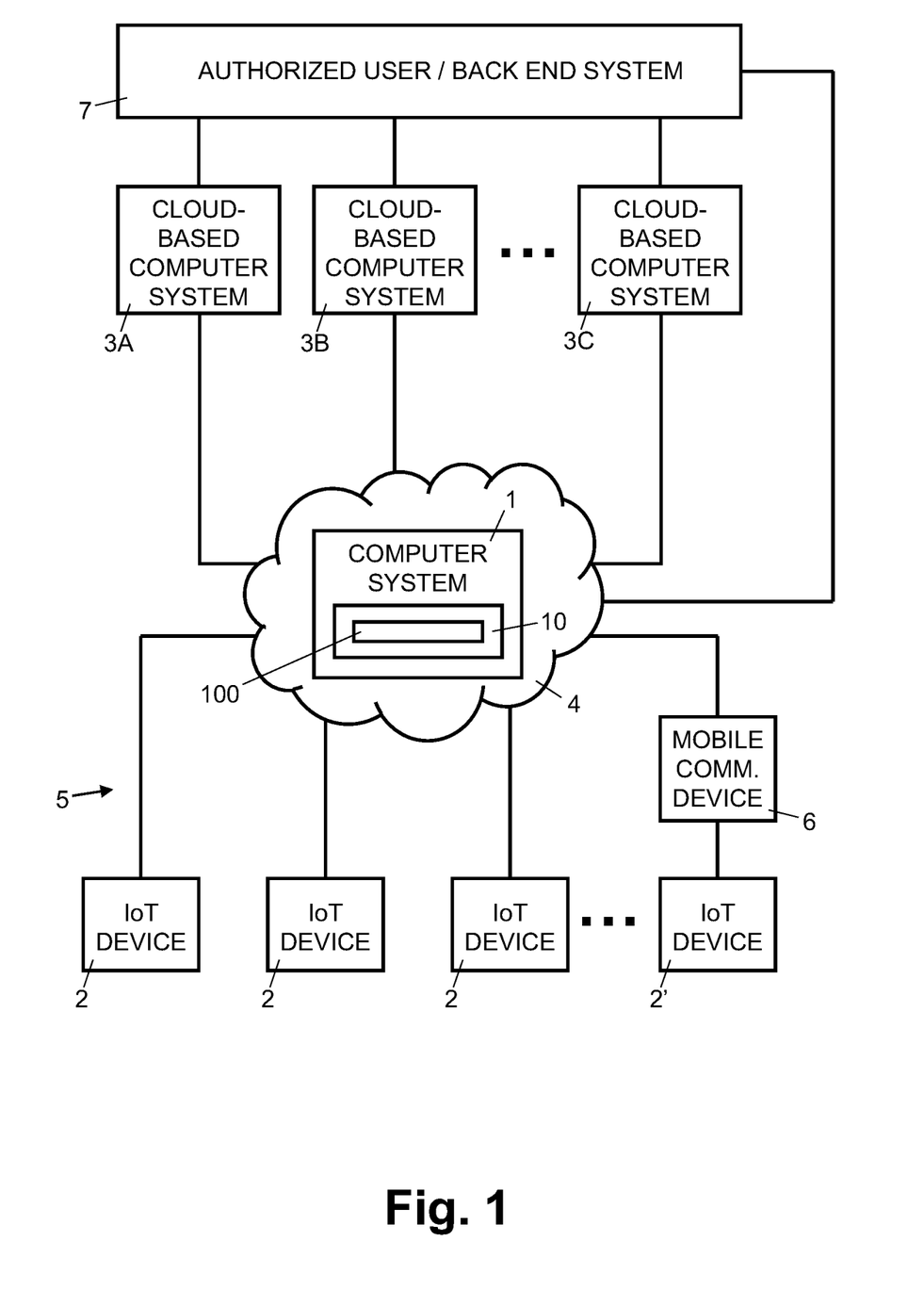
FIG. 1: shows a block diagram of illustrating Internet of Things devices, an intermediary computer system, and several cloud-based computer systems.

In FIG. 1, reference numeral 1 refers to an intermediary computer system. The intermediary computer system 1 may be comprised of more than one computer system located in one or more locations. The intermediary computer system 1 comprises one or more computers with one or more processors 10, along with all other hardware typically associated with a computer system, such as transitory and non-transitory memory, network communication hardware for wired and/or wireless communication. The one or more processors 10 of the intermediary computer system 1 are embodied as CPUs (Central Processing Units), GPUs (Graphic Processing Units), SoCs (System on Chip), and/or other, more application specific electronic circuits such as ASICs (Application Specific Integrated Circuits). Depending on the embodiment, the intermediary computer system 1 is centrally located in one specified location or distributed amongst several locations. The intermediary computer system 1 is be embodied as a server or a server farm, etc. In a variation, the intermediary computer system 1 is implemented as a cloud-based computer system, using a cloud-computing service provider. The intermediary computer system 1 may also be configured and provided as a cloud-computing service.

Reference numeral 2 refers to one or more Internet of Things (IoT) devices. These IoT devices 2 are fixedly installed devices, for example installed on/in a wall or door, at a check-in desk, such as at an airport or hotel, or at a cash-desk of a supermarket. The IoT devices 2 may also be arranged in stationary devices, such as ticketing machines, vending machines, parking meters, etc. The IoT devices 2 may also be integrated into or attached onto vehicles, such as cars, bicycles, e-scooters, etc. The IoT devices 2 are, in an embodiment, access control devices, such as for granting/denying access to a location, product, service, computer system and/or computer network. In an embodiment, the IoT device 2 can be embodied as a terminal device of an access control system. The IoT device 2 may be further connected with a control system, for example a control system of an electronic door, such that a user is granted access to a location by the control system, if the IoT device 2 verifies that the user has access permission, or if the IoT device 2 is sent access permission information from a user device or from a remote server. The IoT devices 2 each comprise one or more electronic circuits, e.g. programmed processor(s) or ASIC(s), configured to perform various functions and steps as described later in more detail. The person skilled in the art will understand that these IoT devices 2 may also be mobile devices, such that they can be carried on or by a user, attached to a movable item such as a package or container, or attached to or integrated with further devices which are mobile either under their own power, such as robots or vehicles, or which are passively mobile, such as weather balloons or buoys.

Reference numeral 4 refers to a communication network. The communication network 4 comprises the Internet, along with other wired or wireless networks between the IoT devices 2 and the intermediary computer system 1. The IoT devices 2 communicate with the intermediary computer system 1 via the communication network 4 and one or more communications channels 5. The communications channels 5 comprise wired or wireless networks, such as wired Local Area Networks (LAN), Wireless Local Area Networks (WLAN), cellular mobile networks (3G, 4G, 5G, etc.), Bluetooth, or other communications protocols. The communications channels 5 may comprise additional network hubs, switches, gateways, etc. which are arranged and configured between IoT devices 2 and the communications network 4. In an embodiment, the IoT devices 2 connect directly to the communications network 4 via a cellular network, e.g. a mobile radio network, such as a GSM or UMTS network. In another embodiment, the IoT devices 2 connect to the communications network 4 via a local gateway. In an embodiment, the gateway is a mobile communications device 6. The mobile communications device 6 may be a smart phone, a laptop computer, a tablet computer, a smart watch, or any other portable device which can act as an intermediary device between the IoT device 2 and the communications network 4. The mobile communications device 6 comprises one or more electronic circuits, including a processor, memory, and communication modules for wired and/or wireless communications with the IoT device 2 and the communications network 4.

The cloud-based computer systems 3A, 3B, 3C are separate and/or different systems which comprise servers. The servers of these cloud-based computer systems 3A, 3B, 3C comprise electronic circuits including processors, such as CPUs and GPUs, transitory and non-transitory memory, and communication modules, such that the cloud-based computer systems 3A, 3B, 3C can communicate, i.e. send and receive data, with the intermediary computer system 1 via the communication network 4. The cloud-based computer systems 3A, 3B, 3C thereby provide computing power, data storage, and data processing and data handling services built thereupon to the intermediary computer system 1. For instance, these cloud-based computer systems 3A, 3B, 3C provide computational services for running and deploying applications, hosting databases and providing storage capabilities, data analytics functionality, identity and security management tools, etc. The cloud-based computer systems 3A, 3B, 3C are, for example, cloud computing services such as Amazon Web Services (AWS), Microsoft Azure, and Google Cloud Platform.

The cloud-based computer systems 3A, 3B, 3C are connected to one or more authorized user systems 7 via a communication network, which communication network may comprise the Internet. The authorized user system 7 is a computer system comprising servers, which servers comprise electronic circuits including processors, transitory and non-transitory memory, and network connectivity hardware modules. In an embodiment, the authorized user system 7 is located in a different location than the cloud based computer systems 3A, 3B, 3C. In another embodiment, however, the authorized user system 7 is located at the same location as the cloud based computer systems 3A, 3B, 3C. In another embodiment, the authorized user system 7 is a virtual system which runs on the cloud based computer systems 3A, 3B, 3C. In an embodiment, the authorized user system 7 is connected to the intermediary computer system 1 via a communication network, without the cloud-based computer systems 3A, 3B, 3C being interposed between the authorized user system 7 and the intermediary computer system 1.

Reference numeral 100 refers to a mapping, specifically a mapping 100 including mapping data. The intermediary computer system 1 stores the mapping 100 in transitory and/or non-transitory memory. The mapping 100 is loaded into transitory memory by retrieval from a non-transient memory comprised within the intermediary computer system 1, or it is received from a storage system external to the intermediary computer system 100. In an embodiment, mapping data for the mapping 100 is defined and transmitted in configuration commands to the intermediary computer system 1 by authorized users of one of the authorized user systems 7, making it possible for the authorized users to flexibly and efficiently manage and change the assignment of their IoT devices 2 to one or more selected cloud-based computer systems 3A, 3B, 3C, and according to various criteria as described below in more detail. The mapping 100 is embodied in one or more database tables, text files, binary files, etc. The database is typically a relational database, however in an embodiment the database is an in-memory database which has the advantage that data such as the mapping 100 can be accessed much faster. The database may also be a federated database which integrates separate databases and offers a single virtual database to which all queries are passed, and which then forwards the queries on to an appropriate database containing the data which is being queried. The mapping 100 comprises mapping data related to assignments of IoT devices 2 to one or more of the cloud-based computer systems 3A, 3B, 3C.

In an embodiment, the mapping 100 comprises mapping data with a hierarchy of mappings, such that IoT devices 2 belonging to a given group or category are assigned to a given cloud-based computer system 3A. The category or group that an IoT device 2 belongs to may be based on the device type, device location, etc. For example, the mapping 100 may assign all IoT devices 2 installed in a given geographic region, such as Europe, to the cloud-based computer system 3A, and all IoT devices 2 installed in another geographic region, such as the US to the cloud-based computer system 3B. Or, for example, the mapping 100 may assign all IoT devices 2 which belong to an access control type to the cloud-based computer system 3A, while IoT devices 2 which have an alternate type are assigned to a different cloud-based computer system 3B, 3C.

This mapping 100 which is based on IoT device 2 type may be based on security considerations, such as ensuring that access credentials or user data, which may be stored on the assigned cloud-based computer system 3A, 3B, 3C, are stored in the same geographic region. This mapping 100 which is based on IoT device 2 type may also be based on technical considerations, such that an IoT device 2 which requires a low latency connection to a cloud-based computer system 3A is assigned to a cloud-based computer system 3A, 3B, 3C in close geographic proximity to the IoT device 2.

In an embodiment, the mapping 100 comprises mapping data with time-based mapping, such that at given time periods the IoT device 2 by the intermediary computing system 1 is mapped to one or more cloud-based computer systems 3A, 3B, 3C, and at a different time period the IoT device 2 is mapped other cloud-based computer systems 3A, 3B, 3C. This time-based mapping enables the intermediary computing system 1 to switch all data received from one or more IoT devices 2 from one cloud-based computer system 3A to another cloud-based computer system 3B at a specified time. This enables a seamless transition from one cloud-based computer system 3A, 3B, 3C, to another.

In an embodiment, the mapping 100 comprises mapping data with a content-based mapping, such that given content received from the IoT device 2 by the intermediary computing system 1 is mapped to one or more cloud-based computer systems 3A, 3B, 3C depending on the type of content received from the IoT device 2. For example, maintenance or diagnostic type data received from the IoT device 2 may be mapped to one particular cloud-based computer system 3A, while security sensitive data may be mapped to another cloud-based computer system 3B.

In an embodiment, the mapping 100 comprises mapping data with a load-dependent mapping, such that data received from the IoT device 2 by the intermediary computing system 1 is mapped to one or more cloud-based computer systems 3A, 3B, 3C depending on a load of the cloud-based computer system 3A, 3B, 3C. The load may be indicative of a current or past load, enabling the intermediary computing system 1 to determine which of the cloud-based computer systems 3A, 3B, 3C to forward the data to. For example, if one of the cloud-based computer systems 3A, 3B, 3C is under a large load, or is suffering from scheduled or unscheduled downtime, for example due to maintenance or unforeseen issues, the intermediary computer system 1 can forward the data received from the IoT device 2 to an alternate cloud-based computer system 3A, 3B, 3C as defined in the mapping 100.

The mapping 100 enables the intermediary device 100 to forward data packages received from the IoT device 2 to one or more cloud-based computer systems 3A, 3B, 3C. The mapping 100 further enables the cloud-based computer systems 3A, 3B, 3C to transmit data to the IoT device 2 via the intermediary computer system 1. The transmitted data may comprise configuration data for configuring of the IoT device 2, diagnostic data for querying a diagnostic state of the IoT device 2, etc. This also in turn enables the authorized user system 7 to transmit data to the IoT device 2 via the cloud-based computer system 3A, 3B, 3C and the intermediary computer system 1.

Figure 2:
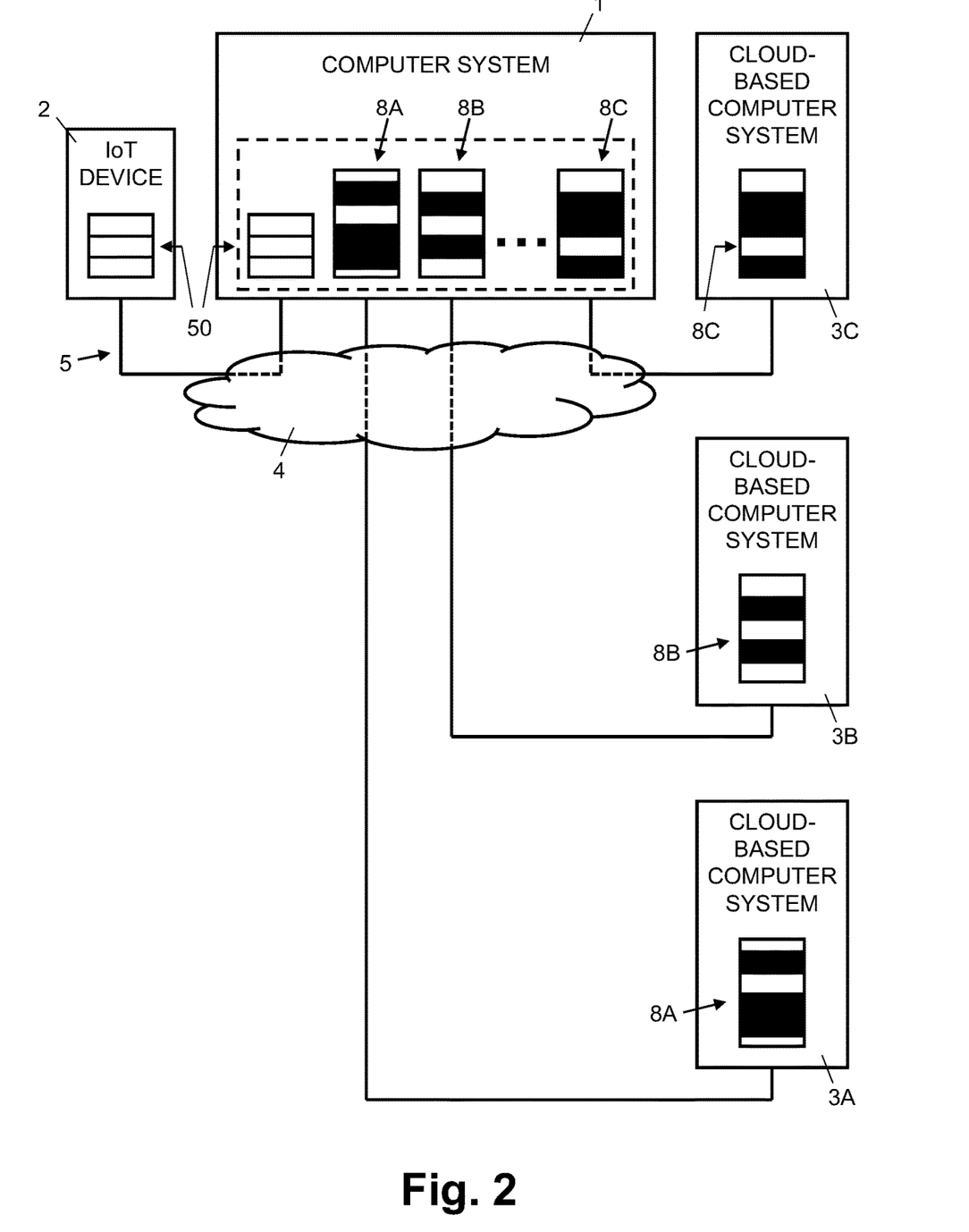
FIG. 2: shows a block diagram illustrating several cloud based computer systems and an intermediary computer system interacting with an Internet of Things device.

FIG. 2 shows the intermediary computer system 1 comprising a plurality of communication protocol stacks 8A, 8B, 8C. These communication protocol stacks 8A, 8B, 8C comprise layers of (software) modules in which each module handles a defined set of tasks and exchanges data with neighboring layers. These communication protocol stacks 8A, 8B, 8C are implemented on the intermediary computer system 1 such that the processor 10 (not shown in this figure) uses the communication protocol stacks 8A, 8B, 8C to communicate with the cloud based computer systems 3A, 3B, 3C, respectively, to which they correspond. The intermediary computer system 1 therefore exchanges data with a given cloud based computer system 3A, 3B, 3C using an appropriate communication protocol stack 8A, 8B, 8C.

An IoT device communication protocol stack 50 is used by the IoT device 2 and the intermediary computer system 1 to exchange data. The IoT device communication protocol stack 50 is implemented on the IoT device 2 and also on the intermediary computer system 1, such that the IoT device 2 and the intermediary computer system 1 can send and receive data from each other across the one or more communication channels 5. For simplicity and efficiency of configuration, the IoT device communication protocol stack 50 is the same for all IoT devices 2. Nevertheless, one skilled in the art will understand that he IoT device communication protocol stack 50 does not necessarily have to be the same for each IoT device 2. For instance, some IoT devices 2 may implement a communication protocol stack 50 which transmits a stream of datagrams, such as UDP (User Datagram Protocol). Alternately, some IoT devices 2 may implement a communication protocol stack 50 which includes features such as sequenced data packets, error checking, and acknowledgements, such as TCP, SSL, or TSL. Additionally, the communication protocol stack 50 may be implemented with or without a security layer, e.g. encryption and/or authentication.

Figure 3:
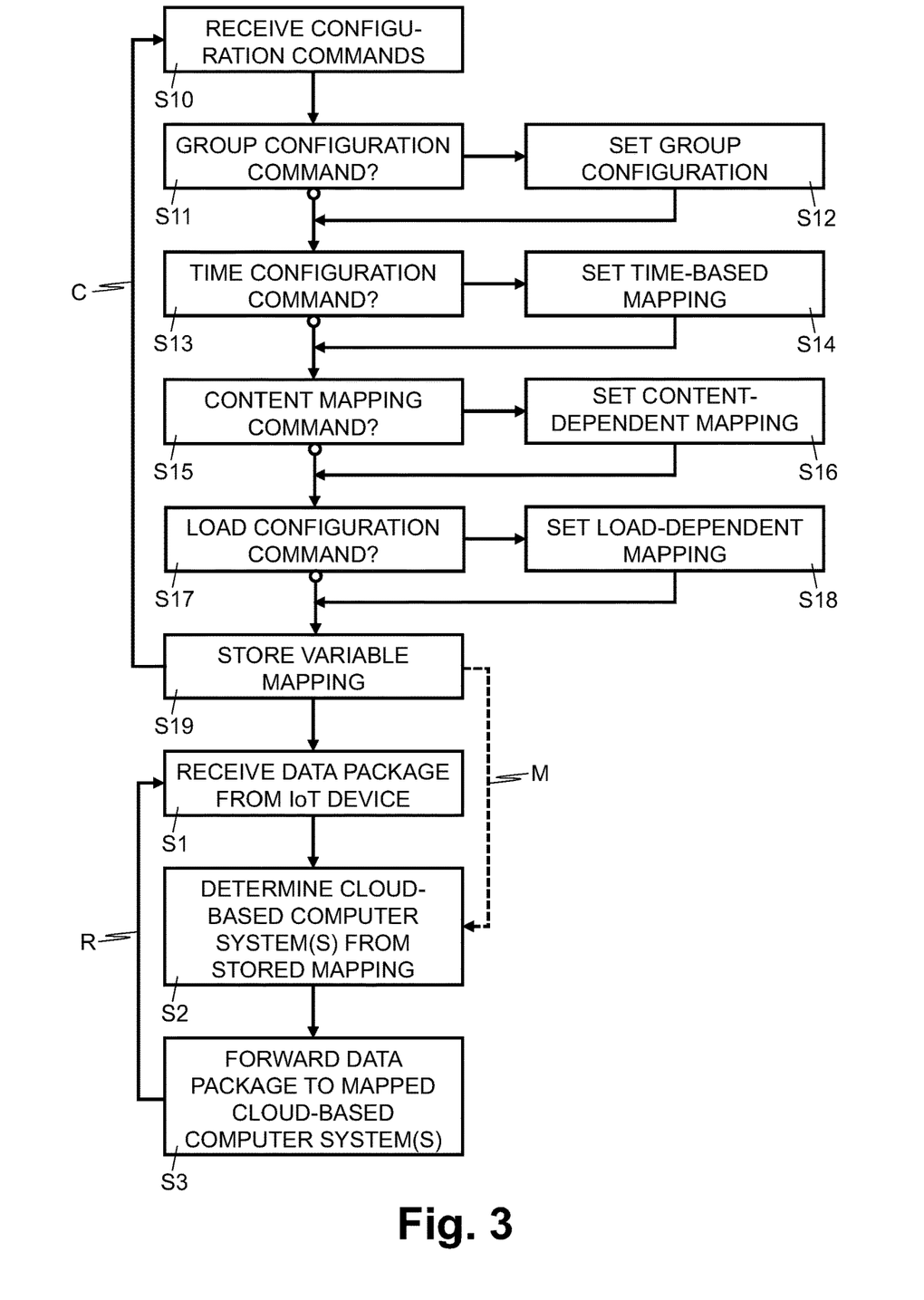
FIG. 3: shows a flow diagram illustrating an exemplary sequence of steps performed by an intermediary computer system for facilitating data communication between an Internet of Things device and a cloud-based computer system.

FIG. 3 shows a flow diagram illustrating an exemplary sequence of steps which an intermediary computer system 1 executes for facilitating data exchange between an IoT device 2 and a cloud-based computing system 3A, 3B, 3C. In a sequence of steps R, comprising the steps S1, S2, and S3, the intermediary computer system 1 receives data from the IoT device 2 and forwards it to one or more of the cloud-based computing systems 3A, 3B, 3C.

In step S1, the intermediary computer system 1 receives a data package from the IoT device 2. The data package is transmitted across the communication channel 5. The data package may be transmitted, using the IoT device communication protocol stack 50, as a sequence of data packets which are acknowledged by the intermediary computer system 1 by sending an acknowledging data packet to the IoT device 2. Further error checking may take place to increase the reliability of the received data. This type of data package transmission is preferable if the reliability of the data is important. Alternatively, or additionally, the data package may also be transmitted, using the IoT device communication protocol stack 50, as a stream of datagrams, which datagrams are not error checked by the receiving intermediary computer system 1 and which are not acknowledged by the intermediary computer system 1 as having arrived. This type of data package transmission is preferable, if a large transmission bandwidth is important, or if a low latency transmission is important, for example in scenarios where the IoT device 2 transmits live data to the intermediary computer system 2. In a variation, the authorized user system 7 exchanges data packages directly with the IoT device 2, via the cloud-based computer system 31, 3B, 3C and the intermediary computer system 1, such that the authorized user system 7 can read from the IOT device 2 device data, e.g. the status of the IoT device 2, and transmit configuration data to the IoT device 2. The authorized user system 7 may provide an interface, such as a Web API (Application Programming Interface), such that a user may read device data, e.g. view the status, and/or write configuration data of an individual IoT device 2, or a group of IoT devices 2, directly using a web browser. Depending on the embodiment, an alternative or additional Web API is implemented on the cloud-based computer system 3A, 3B, 3C, the intermediary computer system 1, and/or an IoT device 2, for read and/or write access to the device and configuration data of an IoT device 2.

In step S2, the intermediary computer system 1 determines, using the mapping 100, which cloud-based computer system 3A, 3B, 3C the data package is to be forwarded to. In a preferable variation, the mapping 100 is retrieved from low latency and high bandwidth memory, such as a non-transient solid-state drive (SSD) or, more preferably, directly from transient random-access memory (RAM). To determine, using the mapping 100, which cloud-based computer system 3A, 3B, 3C the data package is to be forwarded to, the intermediary computer system 1 reads an IoT device identifier from the data package, which identifier uniquely identifies the IoT device 2. The IoT device identifier is contained in a header portion of the data package. The intermediary computer system 1 then performs a look-up operation on the mapping 100 using the IoT device identifier to find a cloud-based computer system identifier. The look-up operation is preferably performed on a pre-fetched mapping 100, i.e. the mapping 100 is already loaded into memory, using a binary search such that the cloud-based computer system identifier is found quickly. In an embodiment, the intermediary computer system 1 stores a subset of the mapping 100 corresponding to frequently requested IoT device identifiers and/or recently request IoT device identifiers into a cache, which the intermediary computer system 1 then performs a look-up on before, if no match is found, performing a look-up on the mapping 100. This decreases the time it takes to find a match for those IoT devices 2 from whom data packages are frequently received.

In step S3, the intermediary computer system 1 forwards the data package to the mapped cloud-based computer system 3A, 3B, 3C. The data package is forwarded to the cloud-based computer system 3A, 3B, 3C corresponding to the cloud-based computer system identifier found during the look-up using the IoT device identifier. The data package is forwarded via the communication network which comprises the Internet. The data package is forwarded using the communication protocol stack 8A, 8B, 8C which corresponds to the cloud-based computer system 3A, 3B, 3C. In a preferred embodiment, the data package is forwarded using a similar category of protocol stack as the IoT device communication protocol stack 50 used for receiving the data package from the IoT Device 2. For example, if the IoT device communication protocol stack 50 is of a type which includes features such as sequenced data packets, error checking, and acknowledgements, such as TCP, then the communication protocol stack 8A, 8B, 8C preferably also implements those same features. Analogously, if the IoT device communication protocol stack 50 is of a type which streams datagrams, such as U D P, then the communication protocol stack 8A, 8B, 8C preferably also implements those same features.

The person skilled in the art will understand that, in addition to the sequence of steps R in which the cloud-based computer systems 3A, 3B, 3C receive the data package from the IoT device 2, the cloud-based computer systems 3A, 3B, 3C can also send data to the IoT device 2, by transmitting data to the intermediary computer system 1 which then forwards the data to the respective IoT device 2. The data sent may prompt the IoT device 2 to return a current status, sensor data, data logs, etc. The data sent may comprise a command, such that the IoT device 2 performs a function, such as shut down, or change status, and the data sent may also comprise configuration data to reconfigure the IoT device 2.

In an embodiment, sequence R comprises the intermediary computing system 1 receiving a data package comprising TCP (Transmission Control Protocol) packets from the IoT device 2, performing a look-up on the mapping 100, and forwarding the data package comprising TCP packets to the appropriate cloud-based computer system 8A, 8B, 8C.

In another embodiment, sequence R comprises the intermediary computing system 1 receiving a data package comprising one or more UDP packets from the IoT device 2, performing a look-up on the pre-fetched mapping 100, and forwarding the data package comprising the UDP packets to the appropriate cloud-based computer system 8A, 8B, 8C. The UDP packets are preferably forwarded by the intermediary computing system 1 as soon as they are received.

In a sequence of steps C, the intermediary computing system 1 receives configuration commands, generates the mapping 100, and stores the mapping 100.

In step S10, the intermediary computing system 1 receives configuration commands from the authorized user system 7. The configuration commands are received via the Internet. The configuration commands comprise configuration data, which the intermediary computing system 1 uses to generate the mapping 100 which maps the IoT device 2 to one or more selected cloud-based computer systems 3A, 3B, 3C.

In step S11, the intermediary computing system 1 checks whether the configuration commands include a group configuration command. If a group configuration command is included, it is used to identify a plurality of IoT devices 2 which are each assigned to one or more groups, each group corresponding to a particular cloud-based computer system 3A, 3B, 3C. A group of IoT Devices 2 may comprise IoT devices 2 of a similar type. For example, all access control terminals may belong to a single group.

In step S12, the intermediary computing system 1 sets the group configuration by generating the mapping 100, or, if the mapping 100 has already been generated, by amending the mapping 100.

In step S13, the intermediary computing system 1 checks whether the configuration commands include a time configuration command. The time configuration command comprises data indicating which IoT device 2 is assigned to which cloud-based computer system 3A, 3B, 3C for which time period(s).

In step S14, the intermediary computing system 1 sets the time-based mapping by generating the mapping 100, or, if the mapping 100 has already been generated, by amending the mapping 100.

In step S15, the intermediary computing system 1 checks whether the configuration commands include a content mapping command.

In step S16, the intermediary computing system 1 sets the content-dependent mapping by generating the mapping 100, or, if the mapping 100 has already been generated, by amending the mapping 100.

In step S17, the intermediary computing system 1 checks whether the configuration commands include a load configuration command.

In step S18, the intermediary computing system 1 sets the load-dependent mapping by generating the mapping 100, or, if the mapping 100 has already been generated, by amending the mapping 100.

In step S19, the intermediary computing system 1, having checked in preceding steps whether the configuration commands include specific commands, and if yes, generating or amending the mapping 100 according to the specific commands, stores the mapping 100. The mapping 100 is stored either locally on non-transient memory of the intermediary computing system 1, or is stored remotely, for example on the authorized user system 7, from where it is retrieved after the IoT device 2 transmits the data package.

It should be noted that, in the description, the sequence of the steps has been presented in a specific order, one skilled in the art will understand, however, that the order of at least some of the steps could be altered, without deviating from the scope of the disclosure.

The invention claimed is:

1. An intermediary computer system for facilitating data communication between an Internet of Things device and a cloud-based computer system, the intermediary computer system comprising one or more processors configured:

to exchange data packages with the Internet of Things device via one or more communication channels;

to exchange data packages with a plurality of cloud-based computer systems via a communication network;

to receive from an authorized user system time configuration commands for a time-based mapping of the Internet of Things device to different cloud-based computer systems of the plurality of cloud-based systems for different time periods;

to store a variable mapping of the Internet of Things device to a selected one or more of the plurality of cloud-based computer systems in response to the time configuration commands;

to receive a data package from the Internet of Things device via the one or more communication channels and to forward the data package via the communication network to the selected one or more of the plurality of cloud-based computer systems mapped to the Internet of Things device depending on a current time and the time-based mapping of the Internet of Things device, to receive data from the selected one or more of the plurality of cloud-based computer systems, and to forward the data received from the selected one or more cloud-based computer systems to the Internet of Things device, using the variable mapping, the data from the selected one or more cloud-based computer systems comprising at least one of: configuration data for configuring the Internet of Things device or a command for the Internet of Things device to perform a function.

2. The intermediary computer system of claim 1, wherein the one or more processors are configured to implement a plurality of different communication protocol stacks; and to exchange the data packages with a particular one of the cloud-based computer systems, using the protocol communication stack associated with the particular one of the cloud-based computer systems.

3. The intermediary computer system of claim 1, wherein the one or more processors are further configured to receive from an authorized user system configuration commands for mapping the Internet of Things device to one or more selected cloud-based computer systems; to store the mapping of the Internet of Things device to the selected one or more cloud-based computer systems, in response to the configuration commands; and to forward the data package received from the Internet of Things device to the selected one or more cloud-based computer systems mapped to the Internet of Things device.

4. The intermediary computer system of claim 1, wherein the one or more processors are further configured to receive from an authorized user system group configuration commands for mapping a defined group of a plurality of Internet of Things devices to one or more selected cloud-based computer systems; to store the mapping of the defined group of Internet of Things devices to the selected one or more cloud-based computer systems, in response to the group configuration commands; and to forward data packages received from one of the defined group of Internet of Things devices to the selected one or more cloud-based computer systems mapped to the defined group of Internet of Things devices.

5. The intermediary computer system of claim 1, wherein the one or more processors are further configured to store a load-dependent mapping of the Internet of Things device to different cloud-based computer systems for different load conditions associated with the different cloud-based computer systems; and to forward data packages received from the Internet of Things device to one or more cloud-based computer systems, depending on current load conditions of the cloud-based computer systems and the load-dependent mapping.

6. The intermediary computer system of claim 1, wherein the one or more processors are further configured to store a content-dependent mapping of the Internet of Things device to different cloud-based computer systems for different content types associated with the data package from the Internet of Things device; to receive from the Internet of Things device a content type indicator with the data package; and to forward the data package received from the Internet of Things device to one or more cloud-based computer systems, depending on the content type indicator received from the Internet of Things device and the content-dependent mapping.

7. The intermediary computer system of claim 1, wherein the one or more processors are configured to exchange the data packages with the Internet of Things device via communication channels comprising at least one of: Radio Frequency IDentifier (RFID), Bluetooth, Bluetooth Low Energy, a Wireless Local Area Network, a cellular mobile radio network, a Local Area Network, or Internet.

8. The intermediary computer system of claim 2, wherein the one or more processors are further configured to receive from an authorized user system configuration commands for mapping the Internet of Things device to one or more selected cloud-based computer systems; to store the mapping of the Internet of Things device to the selected one or more cloud-based computer systems, in response to the configuration commands; and to forward the data package received from the Internet of Things device to the selected one or more cloud-based computer systems mapped to the Internet of Things device.

9. The intermediary computer system of claim 2, wherein the one or more processors are further configured to receive from an authorized user system group configuration commands for mapping a defined group of a plurality of Internet of Things devices to one or more selected cloud-based computer systems; to store the mapping of the defined group of Internet of Things devices to the selected one or more cloud-based computer systems, in response to the group configuration commands; and to forward data packages received from one of the defined group of Internet of Things devices to the selected one or more cloud-based computer systems mapped to the defined group of Internet of Things devices.

10. The intermediary computer system of claim 2, wherein the one or more processors are further configured to store a load-dependent mapping of the Internet of Things device to different cloud-based computer systems for different load conditions associated with the different cloud-based computer systems; and to forward data packages received from the Internet of Things device to one or more cloud-based computer systems, depending on current load conditions of the cloud-based computer systems and the load-dependent mapping.

11. The intermediary computer system of claim 2, wherein the one or more processors are further configured to store a content-dependent mapping of the Internet of Things device to different cloud-based computer systems for different content types associated with the data package from the Internet of Things device; to receive from the Internet of Things device a content type indicator with the data package; and to forward the data package received from the Internet of Things device to one or more cloud-based computer systems, depending on the content type indicator received from the Internet of Things device and the content-dependent mapping.

12. The intermediary computer system of claim 1, amending the variable mapping based upon a new time-based mapping of the Internet of Things device to new different cloud-based computer systems of the plurality of cloud-based systems for new different time periods.

13. A computer-implemented method of facilitating data communication between an Internet of Things device and a cloud-based computer system, the method comprising:
providing an intermediary computer system configured to exchange data packages with the Internet of Things device via one or more communication channels, and to exchange data packages with a plurality of cloud-based computer systems via a communication network;
storing in the intermediary computer system a variable content-dependent mapping of the Internet of Things device to different one or more cloud-based computer systems of the plurality of cloud-based computer systems for different content types associated with data packages from the Internet of Things device;
receiving in the intermediary computer system a data package from the Internet of Things device via the one or more communication channels, the data package including a content type indicator;
forwarding by the intermediary computer system the data package via the communication network to a selected one of the plurality of cloud-based computer systems mapped to the Internet of Things device depending on the content type indicator received from the Internet of Things device and the content-dependent mapping;
receiving data from the selected one of the plurality of cloud-based computer systems, and
forwarding the data received from the selected one of the plurality of cloud-based computer systems to the Internet of Things device, using the variable mapping, the data from the selected one of the cloud-based computer systems comprising at least one of: configuration data for configuring the Internet of Things device or a command for the Internet of Things device to perform a function.

14. The computer-implemented method of claim 13, wherein the method further comprises the intermediary computer system receiving from an authorized user system configuration commands for mapping the Internet of Things device to one or more selected cloud-based computer systems, storing the mapping of the Internet of Things device to the selected one or more cloud-based computer systems, in response to the configuration commands, and forwarding the data package received from the Internet of Things device to the selected one or more cloud-based computer systems mapped to the Internet of Things device.

15. The computer-implemented method of claim 13, the method further comprises the intermediary computer system receiving from an authorized user system group configuration commands for mapping a defined group of a plurality of Internet of Things devices to one or more selected cloud-based computer systems, storing the mapping of the defined group of Internet of Things devices to the selected one or more cloud-based computer systems, in response to the group configuration commands, and forwarding data packages received from one of the defined group of Internet of Things devices to the selected one or more cloud-based computer systems mapped to the defined group of Internet of Things devices.

16. The computer-implemented method of claim 13, wherein the method further comprises the intermediary computer system receiving from an authorized user system time configuration commands for a time-based mapping of one or more Internet of Things devices to different cloud-based computer systems for different time periods, storing the time-based mapping, in response to the time configuration commands, and forwarding data packages received from a particular Internet of Things device to one or more cloud-based computer systems, depending on a current time and the time-based mapping of the particular Internet of Things device.

17. The computer-implemented method of claim 13, wherein the method further comprises the intermediary computer system storing a load-dependent mapping of the Internet of Things device to different cloud-based computer systems for different load conditions associated with the different cloud-based computer systems, and forwarding data packages received from the Internet of Things device to one or more cloud-based computer systems, depending on current load conditions of the cloud-based computer systems and the load-dependent mapping.

18. The computer-implemented method of claim 13, wherein the method further comprises the intermediary computer system storing a content-dependent mapping of the Internet of Things device to different cloud-based computer systems for different content types associated with the data package from the Internet of Things device, receiving from the Internet of Things device a content type indicator with the data package, and forwarding the data package received from the Internet of Things device to one or more cloud-based computer systems, depending on the content type indicator received from the Internet of Things device and the content-dependent mapping.

19. The computer-implemented method of claim 13, wherein the method further comprises the intermediary computer system amending the variable mapping based upon a new content-dependent mapping of the Internet of Things device to new different one or more cloud-based computer systems of the plurality of cloud-based systems for new different content types associated with data packages from the Internet of Things device.

20. A computer program product comprising a non-transitory computer-readable medium having stored thereon computer program code configured to control one or more processors of an intermediary computer system which is configured to exchange data packages with an Internet of Things device via one or more communication channels and to exchange data packages with a plurality of cloud-based computer systems via a communication network, such that the intermediary computer system performs the steps of:

receiving from an authorized user system time configuration commands for a time-based mapping of the Internet of Things device to a first cloud-based computer system of the plurality of cloud-based computer systems for a first time period and a second cloud-based computer system of the plurality of cloud-based computer systems for a second time period, wherein the first and second time periods are different time periods;

storing a variable mapping of the Internet of Things device to a the plurality of cloud-based computer systems in response to the time configuration commands;

receiving a first data package from the Internet of Things device via the one or more communication channels;

forwarding the first data package via the communication network to the first cloud-based computer systems mapped to the Internet of Things device depending on a current time and the time-based mapping of the Internet of Things device, receiving first data from the first cloud-based computer system, forwarding the first data received from the first cloud-based computer system to the Internet of Things device, using the variable mapping, the first data from the first cloud-based computer systems comprising at least one of: configuration data for configuring the Internet of Things device or a command for the Internet of Things device to perform a function;

forwarding the first data package via the communication network to the second cloud-based computer system mapped to the Internet of Things device depending on a new current time and the time-based mapping of the Internet of Things device;

receiving second data from the second cloud-based computer system; and forwarding the second data received from the second cloud-based computer system to the Internet of Things device, using the variable mapping, the second data from the second cloud-based computer system comprising at least a portion of the at least one of: configuration data for configuring the Internet of Things device or the command for the Internet of Things device to perform the function.

* * * * *